Dec. 21, 1954   H. E. SLOAN   2,697,612
LIGHTWEIGHT CHUCK
Filed April 1, 1950   2 Sheets-Sheet 1
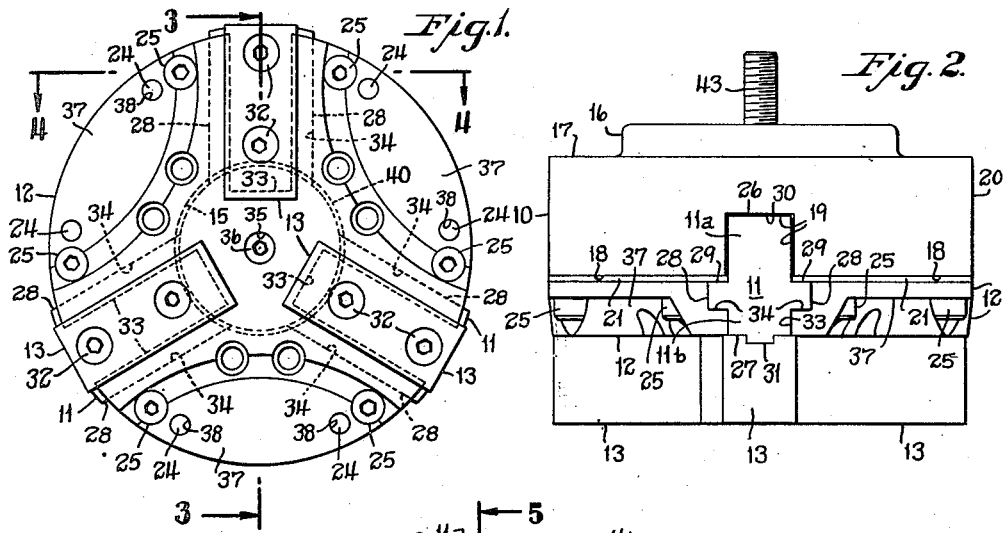
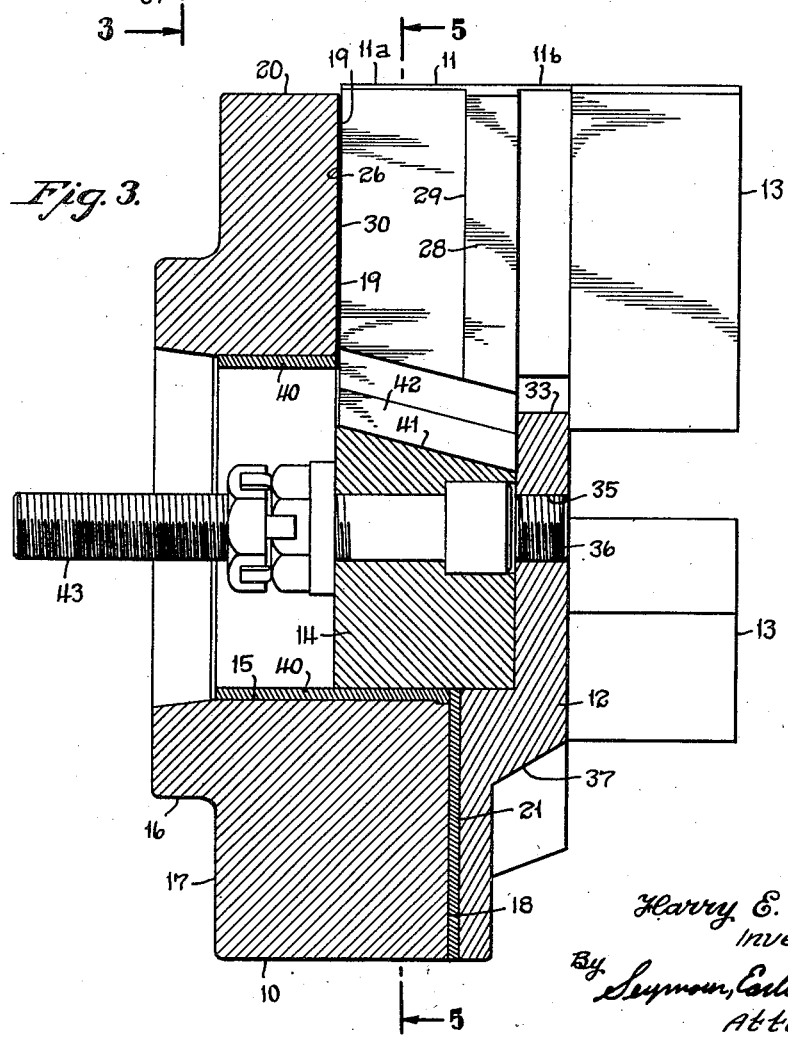
Harry E. Sloan
Inventor
By Seymour, Earle & Nichols
Attorneys Dec. 21, 1954  H. E. SLOAN  2,697,612
LIGHTWEIGHT CHUCK
Filed April 1, 1950  2 Sheets-Sheet 2
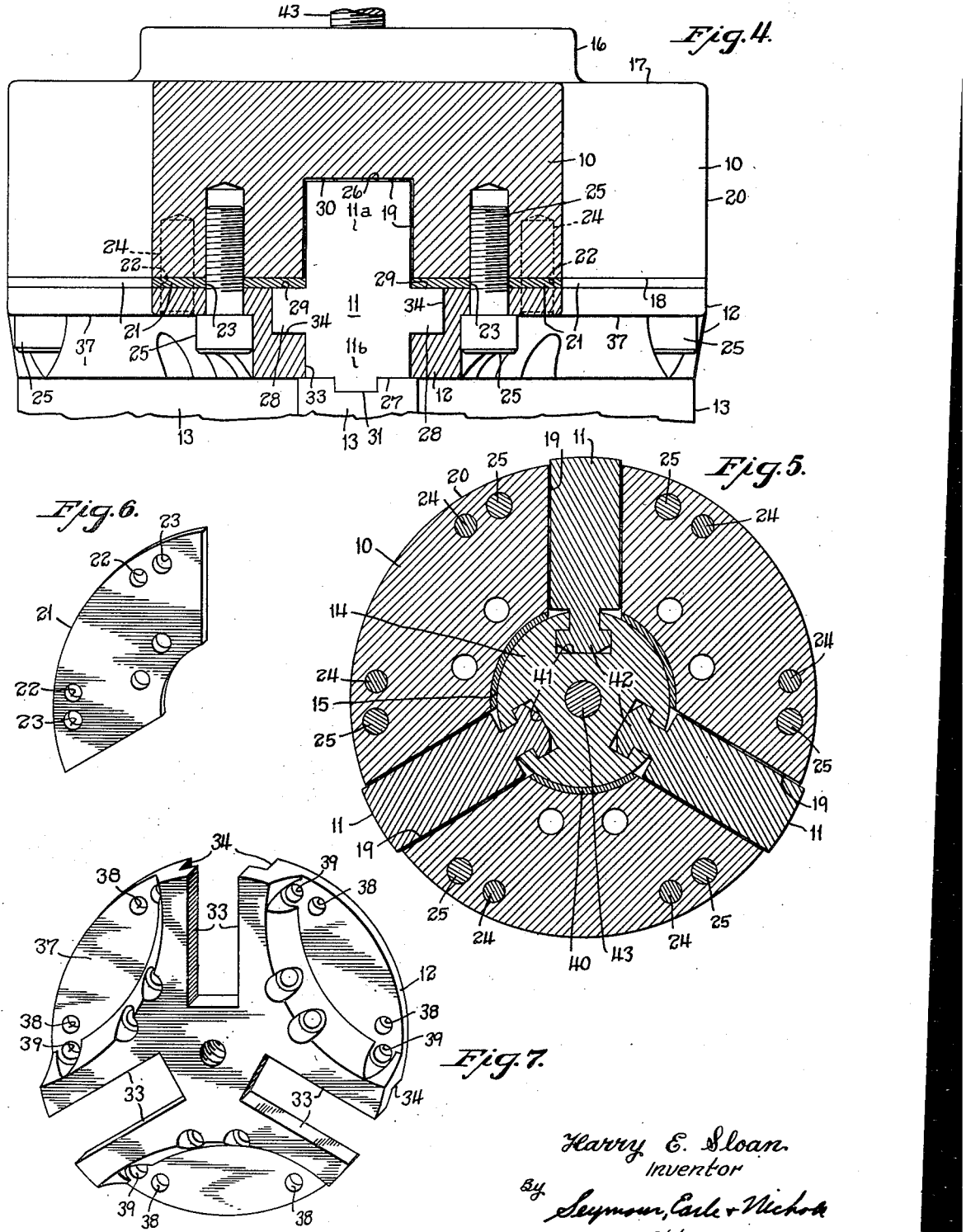
Harry E. Sloan
Inventor
By Seymour, Earle & Nichols
Attorneys

United States Patent Office 2,697,612
Patented Dec. 21, 1954

2,697,612

LIGHTWEIGHT CHUCK

Harry E. Sloan, Hartford, Conn., assignor to The Cushman Chuck Company, Hartford, Conn., a corporation of Connecticut Application April 1, 1950, Serial No. 153,317

8 Claims. (Cl. 279—121)

The present invention relates in general to chucks and more particularly to an improved lightweight chuck of the type having movable wedge-operated jaw units for holding workpieces to be machined or for holding tools for performing operations upon workpieces.

An object of the invention is to provide a superior lightweight chuck.

A further object of the invention is to provide a chuck of high accuracy, durability and superior performance by forming the body of the chuck of a relatively lightweight deformable metal and forming the bearing surfaces for the jaw units of hard metal.

A still further object of the invention is to provide a superior lightweight chuck wherein the body of the chuck is formed of aluminum and the jaw units of the chuck are movably mounted on hard metal bearing surfaces attached to the aluminum body of the chuck.

Other objects and advantages will appear to those skilled in the art from the following, considered in conjunction with the accompanying drawings.

In the accompanying drawings, in which certain modes of carrying out the present invention are shown for illustrative purposes:

Fig. 1 is a front elevation of the improved lightweight chuck of this invention with the jaw units in their closed position;

Fig. 2 is a top plan view of the lightweight chuck of Fig. 1 illustrating the clearance between one of the jaw units and the aluminum body of the chuck;

Fig. 3 is an enlarged side elevation in section on line 3—3 of Fig. 1 showing details of the operating head for expanding and contracting the jaw units of the chuck;

Fig. 4 is a top plan view of the chuck on section line 4—4 of Fig. 1 showing details of the hard metal bearing plates for supporting one of the jaw units in the aluminum body of the chuck;

Fig. 5 is a front elevation in section on line 5—5 of Fig. 3 showing details of the connection between one of the wedge-operated jaw units of the chuck and the operating-head;

Fig. 6 is a perspective view of a segment-like hard metal bearing plate for mounting a jaw unit in the aluminum body of the chuck; and Fig. 7 is a perspective view of the hard metal top plate of the chuck.

The type of chuck used to illustrate the present invention embodies three radially movable jaws operated simultaneously by means of a wedge movably mounted within the body of the chuck, the latter being known to the trade, therefore, as a wedge-type chuck. It will be appreciated, however, that the present invention is not limited to this particular type of chuck, but has application to chucks of other types within the scope of the appended claims.

Heretofore, wedge-type chucks have been formed of hard metal throughout, that is to say, the body, top plate, jaw carriers and jaws have consisted of steel or an equivalent hard relatively heavy metal. While an all-steel chuck is highly satisfactory for most applications, there are operations which call for driving a chuck intermittently at extremely high speeds. In these instances, it has been found that the excessive inertia of the relatively heavy chuck is detrimental to its optimum performance. The present invention provides a lightweight chuck which, on the one hand, eliminates the inertia problems of all-steel chucks of a similar type, and, on the other hand, retains substantially the same excellence of performance.

The chuck shown in the accompanying drawings and chosen for purposes of making clear a preferred form of the present invention comprises a body generally designated by the reference character 10, jaw carriers 11, a unitary top plate 12 which serves to hold the jaw carriers 11 in the body 10 of the chuck and to guide the carriers for movement radially thereon, chuck jaws 13 secured to the jaw carriers 11, and an operating head 14 which, for the particular type of chuck illustrated herein, is referred to as an operating wedge for expanding and contracting the jaws of the chuck. For brevity, the term "jaw unit" will be used hereinafter to denote a jaw carrier 11 and its chuck jaw 13.

The body 10 of the chuck is formed of a lightweight relatively deformable, i. e., non-wear-resistant metal such as aluminum, magnesium, or a metal or alloy of comparably low specific gravity, and is a substantially solid relatively thick disk-shaped member having a relatively large central substantially cylindrical aperture 15 extending concentrically therethrough, the outer end of said aperture 15 intersecting an integral collar 16 formed on the back face 17 of the body 10. The front face 18 of the body 10 is provided with three radial substantially U-shaped clearance grooves 19 substantially equally spaced circumferentially in the front face of the body 10. Each clearance groove is substantially rectangular in cross section and intersects at its inner end the central aperture 15 of the body 10 and at its outer end the peripheral wall 20 thereof.

As indicated in Fig. 1, these clearance grooves 19 divide the front face 18 of the body 10 into three substantially equal sector-like areas, each one of which, in pursuance of the invention, is provided with a sector-like hard metal or hard-surfaced wear-resistant bearing plate 21 of substantially identical dimensions, one of which bearing plates 21 is shown in Fig. 6, each bearing plate being provided with a plurality of apertures 22—23 for accommodating fastening means such as, for example, the pilot pins 24 and screws 25, see Fig. 4, for securing the respective bearing plates 21 to the corresponding sector-like areas of the aluminum body 10.

Each jaw carrier 11 of a jaw unit comprises a solid hard metal block substantially rectangular in cross section, as indicated in Fig. 2, having inner and outer faces 26 and 27 respectively and provided with longitudinal guide ribs 28—28 which extend laterally from opposite sides of the carrier and divide the latter into a body portion 11a and a head portion 11b. The disposition of the aforesaid guide ribs 28—28 of each jaw carrier with respect to its outer and inner faces is such that when the body portion 11a of each jaw carrier is mounted in its respective clearance groove 19 of the chuck-body 10 by engagement of the inner surfaces 29—29 of each guide rib 28—28 respectively with adjacent areas of the corresponding bearing plates 21—21, the inner face 26 of the jaw carrier will be supported in slightly spaced relationship to the adjacent inner surface 30 of its respective clearance groove. Moreover, the transverse dimension of the body portion 11a of each jaw carrier is slightly less than the corresponding dimension of its respective clearance groove, so that clearance is provided between the sides of the body portion 11a of the jaw carrier and the corresponding sides of the respective grooves 19. For clarity, in the drawings the widths of these clearance spaces are exaggerated.

Each jaw carrier 11 is adapted to support one of the chuck jaws 13, and to this end the outer face 27 of the head portion 11b of each jaw carrier is provided with a longitudinal rib 31 substantially rectangular in cross section; and a plurality of internally threaded apertures perpendicular to the outer face 27 of the jaw carrier and extending therethrough into the body thereof for accommodating suitable screws 32 by which each jaw 13 is adapted to be rigidly secured to its respective jaw carrier of the chuck.

Referring again to the jaw carriers 11, the latter are adapted to be held in their respective clearance grooves 19 of the chuck body by retaining means comprising the aforesaid top plate 12 which is formed of a hard metal such as, for example, steel, and comprises a substantially disk-shaped member having three radial guide slots 33 therein which are spaced apart circumferentially corresponding to the spacing of the clearance grooves 19 of the chuck body 10, each guide slot 33 intersecting at its outer end the periphery of the top plate. Each guide slot is substantially equal in width to the width of its respective jaw carrier and is provided with laterally offset substantially rectangular guide recesses 34—34 which extend longitudinally of the respective sides of a guide slot and intersect the back face of the top plate, the cross-sectional dimension of each guide recess 34 corresponding substantially to the cross-sectional dimension of one of the guide ribs 28 of a jaw carrier. The guide recesses of each guide slot are adapted thus to serve as bearing surfaces for the guide ribs of the jaw carriers in the manner hereinafter described.

The hard metal top plate 12 is shown provided with a central internally threaded aperture 35 for accommodating a removable plug 36 which is provided for giving access to the interior of the chuck from the front face thereof. Further, the sector-like portions of the top plate between successive pairs of radial guide slots 33, are recessed as indicated generally at 37 to reduce the weight of the top plate. It is also within the purview of the invention to form recesses or cutouts in other elements of the chuck such as, for example, the jaw units to reduce the mass of the chuck assembly and hence minimize inertia problems.

The top plate is adapted to be rigidly secured against the front faces of the three bearing plates 21 by means of the aforesaid screws 25 and pilot pins 24, which serve to secure the bearing plates 21 to the front face of the chuck body, these screws and pilot pins extending through apertures 38 and 39 respectively of the top plate, through the axially aligned apertures 22—23 of the respective bearing plates 21 and into the body 10 of the chuck. As thus arranged, the bearing plates 21 are sandwiched between the front face 18 of the aluminum body 10 and the top plate 12.

Having mounted the jaw carriers in their respective clearance grooves of the chuck body, then by securing the top plate against the bearing plates 21 of the chuck in the manner hereinabove described, the jaw carriers will be retained in their respective clearance grooves by the top plate 12, the laterally extending guide ribs 28—28 of each jaw carrier making smooth running engagement with adjacent areas of the hard surfaced bearing plates 21 as hereinabove described, and with corresponding surfaces of the guide recesses 34—34 of each guide slot 33 of the top plate. The corresponding areas of the bearing plates form with the corresponding surfaces of the guide recesses, substantially U-shaped guide grooves for accommodating the respective guide ribs of the jaw units, all bearing surfaces of each guide groove being hard wear-resistant metal. Thus, each jaw carrier is movably mounted in the chuck body by a close smooth-running fit with the above identified hard metal bearing surfaces thereof and with clearance between each jaw carrier and the relatively deformable or non-wear-resistant metal of the chuck body, the head portion 11b of each jaw carrier making a smooth-running fit in the corresponding guide slot 33 of the hard metal top plate 12.

The jaw carriers 11 are adapted to be moved in and out simultaneously and substantially radially of the chuck body by means of the operating head or wedge 14 which is reciprocably mounted within the central aperture 15 of the chuck body 10. For satisfactory performance, the central aperture 15 is provided with a bronze bushing 40, or bushing of an equivalent material, which constitutes a wear-resistant bearing surface for the reciprocable operating wedge 14, whereby the latter makes no contact with the aluminum walls of the central aperture 15. The construction of the operating wedge 14 is similar to that of wedges heretofore used for this purpose, its connection with each individual jaw carrier 11 of the chuck being made by means of coupling grooves 41 extending radially from the operating wedge and adapted to accommodate coupling ribs 42 formed integrally on the inner ends of the jaw carriers as indicated especially well in Fig. 5. Inasmuch as this construction is commonly used in all-steel wedge type chucks, further detailed description of the operating wedge and its connection to the respective jaw carriers for moving the latter simultaneously for opening and closing the jaw units of the chuck, is deemed unnecessary.

Actuation of the operating wedge 14 is accomplished automatically or manually, as the case may be, by means of an operating rod 43 attached thereto and effects the expansion and contraction of the jaw units of the chuck, during which movements, the guide ribs of the respective jaw carriers slide in and out of their respective guide grooves of the chuck, all bearing surfaces of which constitute hard metal wear-resistant surfaces of the top plate.

The superior wedge type chuck constructed in the manner and of the materials hereinabove described is extremely light in weight and hence capable of being turned at extremely high speeds for short intervals without giving rise to difficulties in operation due to inertia problems. Moreover, inasmuch as the movable working parts of the chuck bear against hard metal surfaces only, the lightweight chuck retains the high accuracy and durability of an all-steel or heavy metal chuck of similar design.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. A chuck of the character described and including in combination: a relatively lightweight relatively deformable chuck body composed of metal of comparatively low specific gravity and having a face; a relatively hard-surfaced bearing plate mounted on the face of said chuck body; jaw units; a relatively hard-surfaced, unitary jaw unit retaining means constructed and arranged to hold said jaw units against said bearing plate with freedom for movement relative thereto but substantially out of bearing contact with said chuck body; and means for moving said jaw units.

2. A chuck of the character described and including in combination: a relatively lightweight relatively deformable chuck body composed of metal of comparatively low specific gravity and having a face; a relatively hard-surfaced bearing plate mounted on the face of said chuck body; jaw units; a relatively hard-surfaced, unitary jaw unit retaining plate constructed and arranged to hold said jaw units against said bearing plate with freedom for movement relative thereto but substantially out of bearing contact with said chuck body; means for moving said jaw units; and fastening means arranged to secure said bearing plate to the face of said chuck body.

3. A chuck of the character described and including in combination: a relatively lightweight relatively deformable chuck body composed of metal of comparatively low specific gravity and having a face; a relatively hard-surfaced bearing plate mounted on the face of said chuck body; jaw units; a relatively hard-surfaced, unitary jaw unit retaining plate constructed and arranged to hold said jaw units against said bearing plate with freedom for movement relative thereto but substantially out of bearing contact with said chuck body; means for moving said jaw units; and fastening means arranged to secure said bearing plate and said retaining plate to said chuck body.

4. A chuck of the character described and including in combination: a relatively lightweight relatively deformable chuck body having a face provided with clearance grooves; relatively hard-surfaced bearing plates mounted on the grooved face of said chuck body intermediate the clearance grooves of said face; jaw units constructed and arranged to engage in said clearance grooves with clearance between the opposed surfaces of said jaw units and said clearance grooves; a relatively hard-surfaced jaw unit retaining plate constructed and arranged to hold said jaw units against the bearing plates of said chuck face with freedom for movement relative thereto; and means for moving said jaw units simultaneously relative to said chuck body.

5. A chuck of the character described and including in combination; a relatively lightweight relatively deformable chuck body having a face provided with clearance grooves; relatively hard-surfaced bearing plates mounted on the grooved face of said chuck body intermediate the clearance grooves of said face; jaw units constructed and arranged to engage in said clearance grooves with clearance between the opposed surfaces of said jaw units and said clearance grooves; a relatively hard-surfaced jaw unit retaining plate constructed and arranged to hold said jaw units against the bearing plates of said chuck face with freedom for movement relative thereto; means for moving said jaw units simultaneously relative to said chuck body; and fastening means arranged both to secure said bearing plates on the grooved face of said chuck and to secure said retaining plate against said bearing plates.

6. A chuck of the character described and including in combination: a relatively lightweight relatively deformable chuck body having a face provided with clearance grooves; relatively hard-surfaced bearing plates arranged to be mounted on the grooved face of said chuck body intermediate the clearance grooves of said face; jaw units constructed and arranged to engage in said clearance grooves with clearance between the opposed surfaces of said jaw units and said clearance grooves; guide ribs on said jaw units; a relatively hard-surfaced jaw unit retaining plate, said retaining plate being constructed and arranged to coact with said bearing plates to form guide grooves for accommodating the guide ribs of said jaw units thereby to slidably support said jaw units in the clearance grooves of said chuck body for movement relative thereto; and means for moving said jaw units simultaneously relative to said chuck body.

7. A chuck of the character described and including in combination: a relatively lightweight relatively deformable chuck body having a face provided with clearance grooves; relatively hard-surfaced bearing plates adapted to be mounted on the grooved face of said chuck body intermediate the clearance grooves of said face; jaw units constructed and arranged to engage in said clearance grooves with clearance between the opposed surfaces of said jaw units and said clearance grooves; guide ribs projecting laterally from opposite sides respectively of said jaw units; a relatively hard-surfaced jaw unit retaining plate, said retaining plate having recessed guide slots arranged to be disposed substantially opposite the clearance grooves of said chuck body and to coact with the bearing plates on opposite sides respectively of said clearance grooves to form hard-surfaced guide grooves for accommodating the laterally projecting guide ribs of said jaw units thereby to slidably support said jaw units in the clearance grooves of said chuck body for movement relative thereto; and means for moving said jaw units simultaneously relative to said chuck body.

8. A chuck of the character described and including in combination: a relatively lightweight relatively deformable chuck body having a face provided with clearance grooves; relatively hard-surfaced bearing plates adapted to be mounted on the grooved face of said chuck body intermediate the clearance grooves of said face; jaw units constructed and arranged to engage in said clearance grooves with clearance between the opposed surfaces of said jaw units and said clearance grooves; guide ribs projecting laterally from opposite sides respectively of said jaw units; a relatively hard-surfaced jaw unit retaining plate, said retaining plate having recessed guide slots arranged to be disposed substantially opposite the clearance grooves of said chuck body and to coact with the bearing plates on opposite sides respectively of said clearance grooves to form hard-surfaced guide grooves for accommodating the laterally projecting guide ribs of said jaw units thereby to slidably support said jaw units in the clearance grooves of said chuck body for movement relative thereto; means for moving said jaw units simultaneously relative to said chuck body; and fastening means arranged both to secure said bearing plates on the grooved face of said chuck and to secure said retaining plate against said bearing plates.

References Cited in the file of this patent

UNITED STATES PATENTS

| Number | Name | Date |
|---|---|---|
| 460,601 | Skinner | Oct. 6, 1891 |
| 1,305,138 | McClellan | May 27, 1919 |
| 1,335,714 | Lea | Mar. 30, 1920 |
| 1,420,682 | Bright | June 27, 1922 |
| 1,864,423 | Forkardt | June 21, 1932 |
| 2,191,371 | Church | Feb. 20, 1940 |
| 2,513,284 | Church | July 4, 1950 |